(12) United States Patent
Brown et al.

(10) Patent No.: US 9,896,276 B2
(45) Date of Patent: Feb. 20, 2018

(54) METHOD AND APPARATUS FOR AUTOMATICALLY AND VISUALLY MONITORING WEAR OF A CONTINUOUS CHAIN

(71) Applicant: Patco Sales & Service, Inc.

(72) Inventors: Patrick Brown, Hesperia, MI (US); Mark Meade, Grand Haven, MI (US)

(73) Assignee: Patco Sales and Services, Inc., Fremont, MI (US)

( * ) Notice: Subject to any disclaimer, the term of this patent is extended or adjusted under 35 U.S.C. 154(b) by 0 days.

(21) Appl. No.: 15/416,163

(22) Filed: Jan. 26, 2017

(65) Prior Publication Data

US 2017/0225901 A1 Aug. 10, 2017

Related U.S. Application Data

(60) Provisional application No. 62/287,213, filed on Jan. 26, 2016.

(51) Int. Cl.
| | |
|---|---|
| *B65G 43/02* | (2006.01) |
| *B65G 43/00* | (2006.01) |
| *B65G 45/08* | (2006.01) |
| *B65G 17/20* | (2006.01) |

(52) U.S. Cl.
CPC ............. *B65G 43/02* (2013.01); *B65G 17/20* (2013.01); *B65G 45/08* (2013.01)

(58) Field of Classification Search
None
See application file for complete search history.

(56) References Cited

U.S. PATENT DOCUMENTS

| | | | |
|---|---|---|---|
| 3,989,989 A | 11/1976 | Mayer | |
| 3,998,317 A | 12/1976 | Stinnett | |
| 4,274,783 A | 6/1981 | Eineichner et al. | |
| 4,407,162 A | 10/1983 | Landenberger | |
| 4,506,763 A | 3/1985 | Frost et al. | |
| 4,537,285 A | 8/1985 | Brown et al. | |
| 4,648,486 A | 3/1987 | Kayser et al. | |
| 5,092,446 A | 3/1992 | Sullivan, Jr. et al. | |
| 5,248,027 A | 9/1993 | Kluger et al. | |
| 5,291,131 A | 3/1994 | Suzuki et al. | |

(Continued)

*Primary Examiner* — Kavel Singh
(74) *Attorney, Agent, or Firm* — Young Basile Hanlon & MacFarlane, P.C.

(57) ABSTRACT

A method and apparatus for automatically and visually monitoring the wear of a continuous conveyor chain without having to stop the conveyor chain. The method and apparatus provides first and second sensors fixedly spaced along the conveyor chain at a predetermined distance and first and second opposing visualization devices oppositely positioned at a point along the conveyor chain. The first and second sensors generate signals corresponding to the presence and absence of successive links provided in the conveyor chain. The generated signals are received and processed, and the necessary time intervals are calculated for providing an output indicative of chain wear of any portion of the chain. Several parameters of chain wear may be calculated, including chain stretch and instantaneous chain speed. The first and second visualization devices capture visual images of each of the links so as to visually inspect and identify any problems associated with the links.

16 Claims, 6 Drawing Sheets

(56) References Cited

U.S. PATENT DOCUMENTS

| | | | |
|---|---|---|---|
| 5,337,885 A | 8/1994 | Mills et al. | |
| 5,563,392 A | 10/1996 | Brown et al. | |
| 7,540,374 B2 * | 6/2009 | Rathbun | B65G 43/02 198/502.1 |
| 2007/0056379 A1 * | 3/2007 | Nassar | B65G 43/00 73/774 |

* cited by examiner

ZERO CHAIN STRETCH FIG. 5A

CHAIN STRETCH FIG. 5B

METHOD AND APPARATUS FOR AUTOMATICALLY AND VISUALLY MONITORING WEAR OF A CONTINUOUS CHAIN

CROSS-REFERENCE TO RELATED APPLICATIONS

This application claims priority to U.S. Provisional Patent Application Ser. No. 62/287,213, filed Jan. 26, 2016.

FIELD OF THE INVENTION

The present invention relates to a method and apparatus for monitoring wear of a continuous chain, and more particularly, an improved method and apparatus for automatically and visually monitoring the wear of a continuous conveyor chain without having to stop the chain.

BACKGROUND

A common method of moving parts or components along a manufacturing assembly line is by means of overhead conveyors. Such conveyors may be formed of a number of wheeled trolleys that ride along a guideway or track in a continuous closed loop. The trolleys are connected by a conveyor chain formed of a number of connected links, and the parts or components are suspended from the trolley.

The conveyor chain is typically driven by a motorized sprocket assembly that provides force for powering the wheeled trolleys along the guideway or track. Although the wheeled trolleys and the parts or components suspended from the trolley have their weight supported by the guideway or track, the conveyor chain is still subjected to wear over an extended period of time. These conveyor chains may be very lengthy, as they may travel and extend throughout a large production facility. Thus, such conveyor chains may be subjected to numerous random forces and stress as well as a variety of environmental conditions such as heat fluctuations, oils, solvents, and other caustic solutions.

In order to reduce the wear on the wheeled trolleys and the conveyor chain, lubrication oil is typically applied to the wheeled trolleys along the guideway or track and to pivot pins that connect successive links of the conveyor chain. The lubrication oil reduces friction and heat created by the stresses that are generated through the forces applied to the wheeled trolleys and the conveyor chain. Automated lubrication oil systems have been created to automatically apply the lubrication oil to the wheeled trolleys and the conveyor chain wherein spray nozzles or other applicators are mounted adjacent the wheeled trolleys and the conveyor chain to apply the lubrication oil. On occasion, such spray nozzles or applicators may become dislodged from their proper position due to vibration from the wheeled trolley and the conveyor chain or from random forces that may occur in a manufacturing environment. When this occurs, the lubrication oil may not be properly applied to the wheeled trolley and conveyor chain, and thus, the wheeled trolley and conveyor chain may wear at a faster rate than usual. There are no known monitoring systems for ensuring that such lubrication is being properly applied to the wheeled trolleys and conveyor chain, and therefore, it would be beneficial to provide a monitoring system to ensure for the proper lubrication by such automated lubrication systems.

Although properly lubricating the conveyor chain will assist in reducing wear, wear of the conveyor will inevitably occur due to the above-noted conditions. The wear of the conveyor chain should be monitored in order to prevent the conveyor chain from breaking or possibly damaging other components of the conveyor system. One of the most closely watched chain wear parameters is chain stretch that is defined as the linear distance in which the chain lengthens over a period of time due to wear. Chain stretch often occurs through the eventual wearing of the conveyor chain's pivot pins which, as previously noted, are utilized to connect successive links of the conveyor chain. The movement of the pivot pins within the apertures of the links eventually wears the pivot pins and creates "slop". This "slop", along with yielding of the links, will essentially make the conveyor chain longer when pulled taught.

Minor wear or chain stretch is allowable and expected within the industry, but when chain stretch becomes excessive, it may cause numerous problems. For one, the sprocket may not be able to properly engage the conveyor chain should the chain stretch become excessive enough that the teeth of the sprocket skip a space between links or apply forces to a link that may bend or damage the conveyor chain. Also, extensive chain stretch may cause the conveyor chain to sag, thus affecting the smooth travel of the wheeled trolleys along the guideway or track. Yet, the greatest concern is that excessive chain stretch may lead to the eventual thinning and breaking of the conveyor chain.

In order to monitor the chain stretch of a conveyor chain, a certain length of the conveyor chain is often measured manually to ensure that the chain stretch does not exceed a predetermined value. It is well known and common in the art to monitor and measure ten foot sections of the conveyor chain. The problem with making such manual measurements is that the conveyor chain must be stopped in order to make a proper measurement. This requires the entire conveyor to be shut down, which prevents and delays the parts or components delivered by the conveyor from being supplied to the assembly or production line. Obviously, this creates inefficiencies that are undesirable in a production environment.

In addition, manual measurements of chain stretch typically have the problem of being inaccurate, as they are conducted with tape measures, which can hardly be considered accurate for repetitive measurements of ten foot chain lengths. Also, the ten foot sections of conveyor chain selected for measurement is typically random, and therefore, no recorded history exists or is maintained as to the wear of that particular section of conveyor chain. This becomes an even greater disadvantage when a portion of the chain has been replaced by either a different manufacturer or different material, and thus, an evaluation as to the performance and wear of the individual sections of the conveyor chain cannot be made. Furthermore, manual chain wear measurements rely on an operator to continually measure the conveyor chain. Should the operator fail to continually monitor the chain, any number of the above-noted results can occur.

More recent designs have utilized sensors spaced along the conveyor chain at predetermined distances to generate signals corresponding to the presence and absence of chain links within the conveyor chain. The signals are processed and compared to predetermined values to determine if any of the chain links have excessive wear or stretching. Although the process can occur without stopping the conveyor chain, the inspection and maintenance of the conveyor chain still requires the conveyor chain be stopped and manually inspected. Since most industrial conveyor chains extend through manufacturing facilities and are relatively long, the actual discovery and maintenance of a worn chain link of the conveyor chain can require an excessive amount of time which is undesirable in an industrial environment. Thus, it would be desirable to provide a conveyor chain monitoring system that accurately and immediately identified the location and nature of the wear of the conveyor chain so as to reduce the time associated with stopping, identifying, and maintaining the conveyor chain.

SUMMARY

A method for automatically and visually monitoring wear of a continuous chain having a plurality of links successively connected. The method includes spacedly positioning a pair of sensors along the conveyor chain, wherein the sensors generate signals by sensing the presence and absence of each of the links. A pair of opposing visualization devices is mounted at a point along the chain in order to capture images of each of the links. The signals are continually generated and processed by the sensors for each of the links to calculate the necessary time intervals for providing an output indicative of chain wear. When the output exceeds a predetermined value, a signal is provided indicating excessive wear on the conveyor chain. Selective images of any link throughout the entire continuous chain may be displayed, wherein the displayed images correspond to the links identified by the sensors.

An apparatus for automatically and visually monitoring the wear of a continuous chain having a plurality of links successively connected. The apparatus includes first and second sensors that are spacedly positioned along the conveyor chain for sensing the presence of each of the links, and first and second opposing visualization devices are positioned at a point along the chain for visually capturing images of each of the links. A processor processes the signals generated by the sensors to calculate the necessary time intervals for providing an output indicative of the chain wear. The signals are continually generated and processed for each of the links throughout the entire continuous chain to provide an output indicative of chain wear of any portion of the chain. An indicator indicates when the output exceeds a predetermined value, and a display device selectively displays the images captured of each of the links.

DETAILED DESCRIPTION

Figure 1:
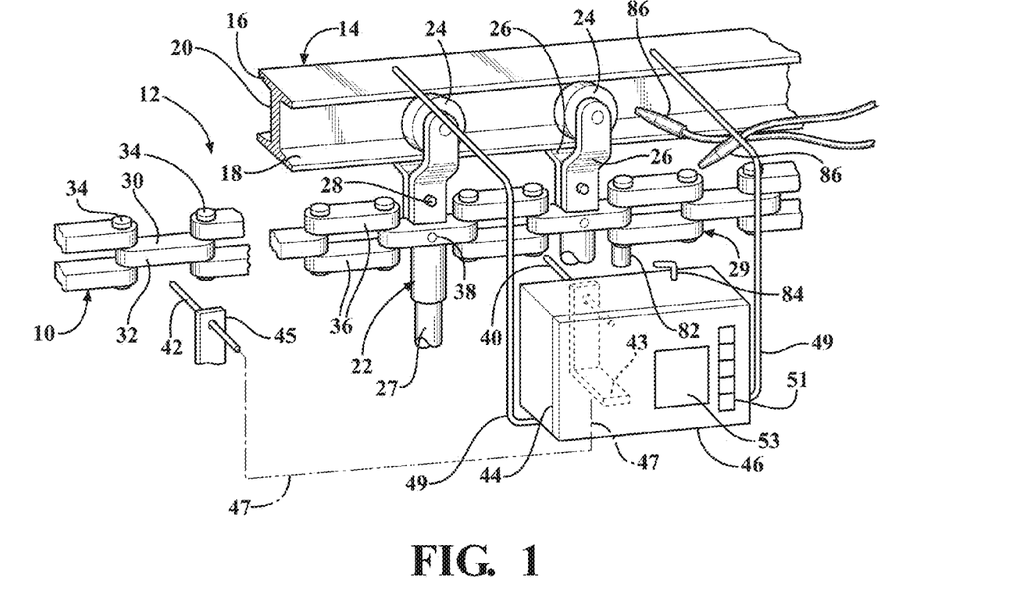
FIG. 1 is a perspective view showing the conveyor chain and wheeled trolleys with the pair of photoelectric sensors adjacent and along the conveyor chain.

FIG. 1 is a perspective view of the method and apparatus for automatically and visually monitoring the wear of a conveyor chain 10 being utilized in a moveable conveyor 12. The conveyor 12 is in the form of a continuous closed-loop path having an elongated, continuous track or guideway 14. The track or guideway 14 may be in the form of an I-beam having spaced, horizontally extending legs 16, 18 that are interconnected by a vertical intermediate web portion 20. The lower horizontal leg 18 forms a track for a plurality of trolleys 22 to move along. Each of the trolleys 22 include two rollers or wheels 24 (only one shown), which ride along the horizontal leg 18 of the I-beam 14 on opposite sides of the intermediate web portion 20. Arms 26 are connected to and descend downward from each of the rollers 24 and are interconnected at a lower end of the arms 26 by a conventional fastener 28. A hanger 27 is connected to the lower end of the arms 26 on each trolley 22 for supporting parts or components (not shown) therefrom. At least one lubrication applicator, such as spray nozzles 86, from an automated lubrication system may be mounted adjacent the trolleys 22 and the conveyor chain 10 to automatically apply lubrication oil to the trolleys 22 and the conveyor chain 10 in order to reduce the friction and wear associated with the trolleys 22 and the conveyor chain 10. The spray nozzles 86 may be mounted and positioned in a conventional manner.

As seen in FIGS. 1-4, the conveyor chain 10 is formed of a plurality of interconnected successive chain links 29. Each chain link 29 provides an integral one-piece primary link 30 and an adjacent connecting link 36. The primary link 30 has a solid perimeter surface 32 with apertures (not shown) at each of their ends extending there through. Pivot pins 34 are utilized to pivotally connect the primary links 30 of the chain to the alternating connecting links 36. The connecting links 36 utilize a pair of spaced, substantially parallel members extending across the top and bottom portions of the primary links 30. A space is created between the substantially parallel connecting links 36, as well as between adjacent successive primary links 30.

As seen in FIG. 1, each of the primary links 30 has a centrally disposed opening (not shown) wherein the trolley 22 extends therethrough and is connected to the primary link 30 by a conventional fastener 38. The conveyor chain 10 is driven in a conventional manner, such as by a motorized sprocket (not shown), so that forces transmitted through the primary links 30 to the trolleys 22 cause movement of the trolleys 22 along the track 14.

In order to automatically monitor wear of the conveyor chain 10, first and second sensors 40, 42 are fixedly mounted along the conveyor chain 10 at a predetermined distance to sense the primary links 30. In the illustrated example, photoelectric sensors 40, 42 are utilized as the first and second sensors, respectively. Other sensors may also be utilized, such as proximity switches, photodiodes, lasers, limit switches, and any other compatible sensing devices. The photoelectric sensors 40, 42 are fixedly mounted adjacent the primary links 30 such that the photoelectric sensors 40, 42 may sense the presence and absence of the primary links 30, as the conveyor chain 10 travels in front of the photoelectric sensors 40, 42. A bracket 43 is shown extending from an enclosure 44 for supporting the first photoelectric sensor 40 in a fixed position. A similar bracket 45 is also partially shown supporting the second photoelectric sensor 42 in a fixed position wherein the bracket 45 may be mounted to any fixed structure (not shown). The photoelectric sensors 40, 42 generate signals by sensing the presence and absence of the primary links 30, and these signals are sent to a controller 46 via electrical wires 47.

Figure 3:
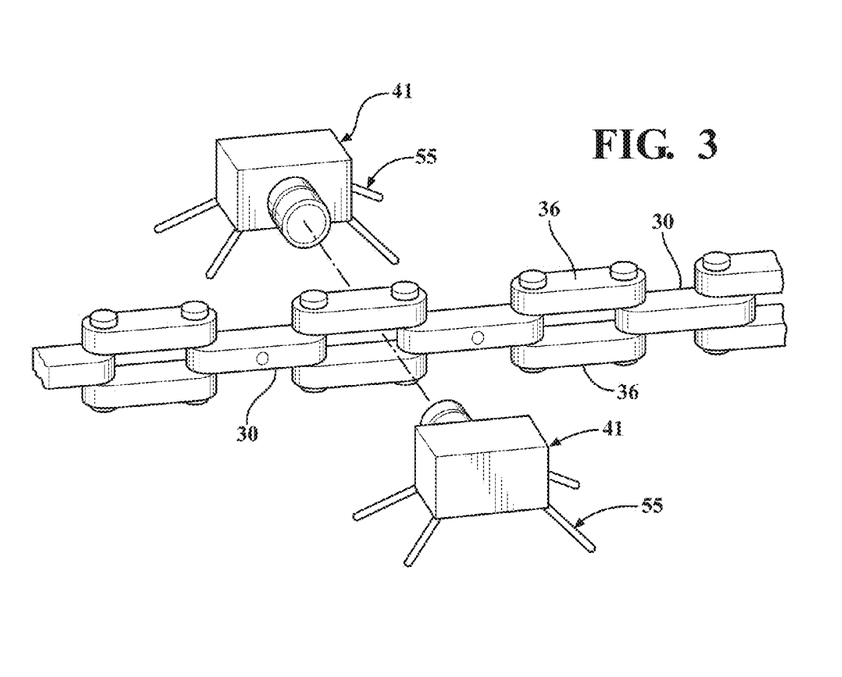
FIG. 3 is a perspective view showing the pair of visualization devices with respect to the conveyor chain.
Figure 4:
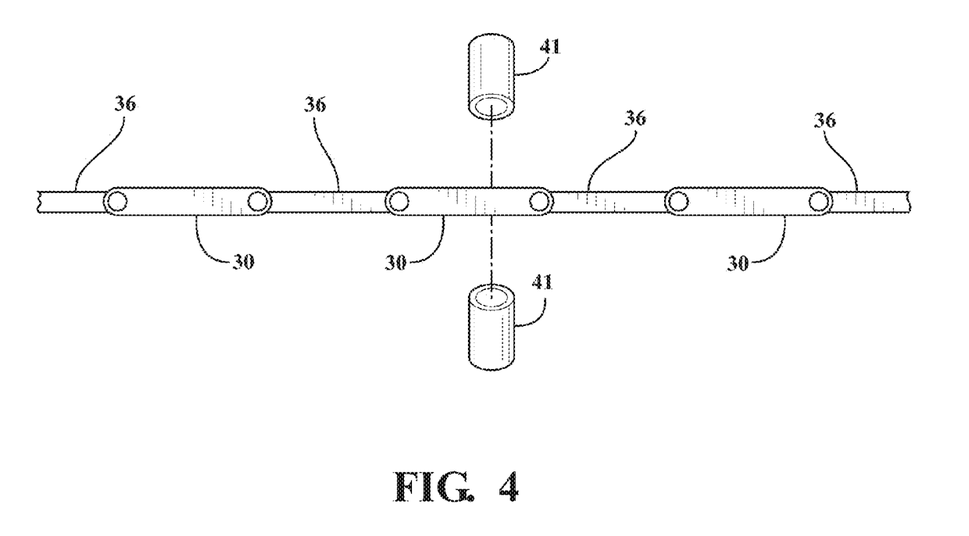
FIG. 4 is a top view of the conveyor chain showing the positioning of the pair of visualization devices with respect to the conveyor chain.

In order to visually monitor wear of each link 29 of the conveyor chain 10, first and second visualization devices 41 are fixedly mounted along the conveyor chain 10, as seen in FIGS. 3-4. Brackets (not shown) may be used to mount the first and second visualization devices 41 in a fashion that is similar to how the photoelectric sensors 40, 42 are mounted by brackets 43, 45. Separate tripods 55 may also be utilized to independently support the visualization devices 41. The first and second visualization devices 41 may be any type of webcams, infrared cameras, video cameras, ultrasonic cameras, or similar types of high-speed imaging devices. Due to the high speed imaging of the visualization devices 41, the visualization devices 41 are able to capture multiple images of each link 29 of the conveyor chain 10 thereby giving the operator multiple views and angles of each link 29. As shown in FIGS. 3-4, the first and second visualization devices 41 are mounted directly across from one another at a point along opposite sides of the conveyor chain 10, such that images from both sides of each link 29 of the conveyor chain 10 can be captured and displayed on a monitor. Although the visualization devices 41 are video cameras, the visualization devices 41 have the ability to show still images of the links 29 at any time. The visualization devices 41 are in electronic communication with the controller 46, either by a wireless connection, such as Bluetooth technology, or by electric wires. The visualization devices 41 and the controller 46 are able to communicate electronically so as to correlate and identify the specific links 29 of the conveyor chain 10 with the images captured by the visualization devices 41.

The first and second visualization devices 41 may also be utilized to monitor the positioning and the performance of the spray nozzles 86 by either capturing the spray nozzles 86 in the same image as the conveyor chain 10 or by utilizing a separate visualization device 41 for monitoring the spray nozzles 86 independently. In both situations, the image of the spray nozzles 86 can be captured and displayed on a monitor so that the operator can determine whether the spray nozzles 86 are properly positioned and operating. If the operator discovers that the spray nozzles 86 are not properly positioned or operating such that the trolleys 22 and conveyor chain 10 are not being properly lubricated, then the operator can perform the necessary maintenance on the spray nozzles 86, thereby avoiding any wear that may occur to the trolleys 22 and the conveyor chain 10 caused by a lack of lubrication.

In order to process the signals generated by the photoelectric sensors 40, 42 and display the images captured by the first and second visualization devices 41, the controller 46 includes a processor, a computer program stored in memory for performing calculations, a memory for storing values, an input 51 for values, and an output for values, and a display 53 for messaging. The controller 46 is supported by a tubular bracket 49 that extends outward from and is connected to the upper leg 16 of the I-beam 14.

Figure 2:
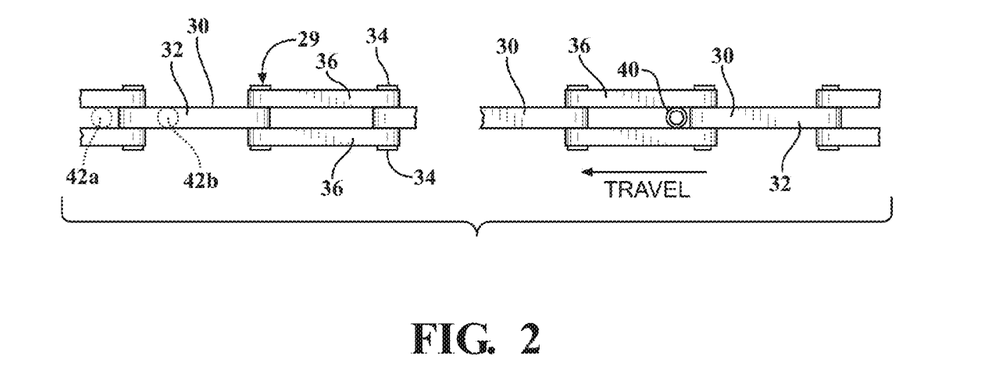
FIG. 2 is a side view of the conveyor chain showing the positioning of the photoelectric sensors with respect to the conveyor chain.
Figure 5A:
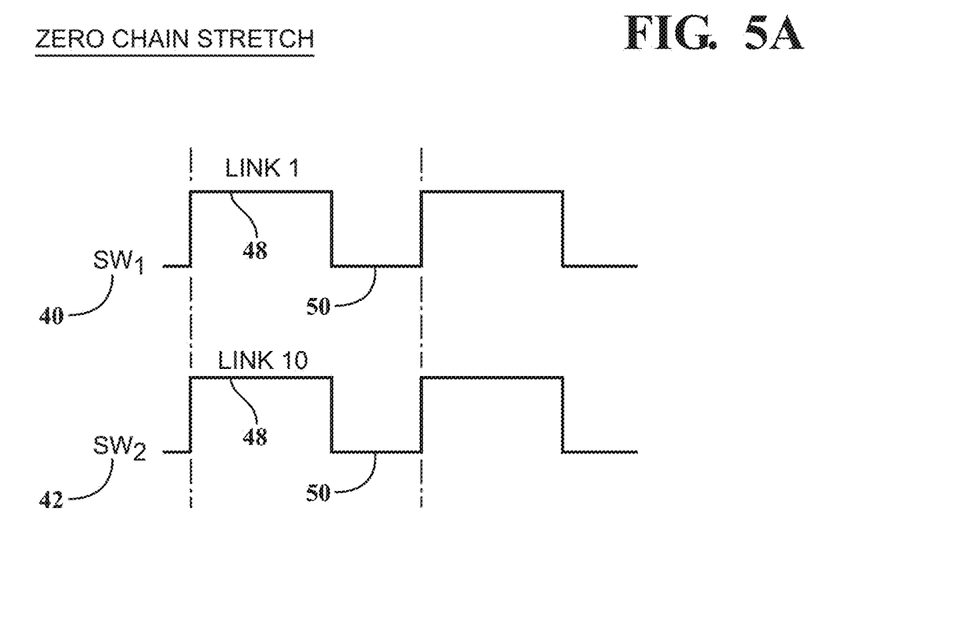
FIGS. 5A-5B are graphic representations of the actuation of the photoelectric sensors between a first state and a second state and showing the differences between zero chain stretch and a chain stretch greater than zero.
Figure 5B:
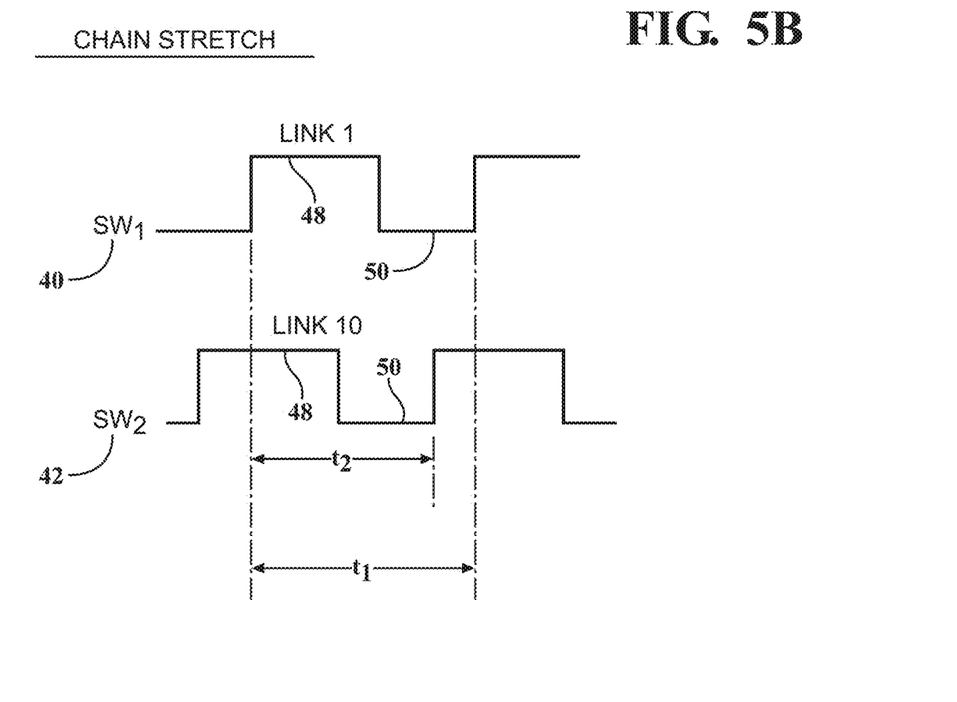

The pair of photoelectric sensors 40, 42 may be spacedly mounted at common locations with respect to the primary links 30 when the chain stretch is zero or when an initial origin for monitoring wear of the conveyor chain 10 is established. As shown in FIG. 2, the second photoelectric sensor 42 is represented by 42(a) when the chain stretch is zero. As seen in FIG. 5, when the conveyor chain 10 is moving, the photoelectric sensors 40, 42 or SW1, SW2 respectively, are actuated simultaneously between a first state 48, wherein the photoelectric sensors 40, 42 sense the presence of the primary link 30, and a second state 50, wherein the photoelectric sensors 40, 42 sense the absence of the primary link 30. In other words, the photoelectric sensors 40, 42 sense the separating of successive primary links 30. As previously mentioned, the photoelectric sensors 40, 42 are spaced a predetermined distance from one another. The photoelectric sensors 40, 42 may be spaced ten feet apart or ten chain links 29 apart if each chain link 29 is one-foot long. Thus, the actuation of the photoelectric sensors 40, 42 corresponds to link 1 and link 10, respectively, as seen in FIG. 5.

Over an extended period of time, the conveyor chain 10 will begin to wear as the pivot pins 34 and the chain links 29 begin to wear, causing "slop" within the conveyor chain 10. When the conveyor chain 10 is pulled taught, the wear or "slop" will be realized as a lengthening or stretching of the conveyor chain 10. As the conveyor chain 10 stretches or lengthens and the conveyor chain 10 continues to travel about its continuous loop, the second photoelectric sensor 42 begins to actuate into the first state 48 prior to the first photoelectric sensor 40 actuating into the first state 48 as the lengthening of the conveyor chain 10 causes the second photoelectric sensor 42 to sense the primary link 30 prior to the first photoelectric sensor 40 sensing the primary link 30 a predetermined number of chain links 29 away. In other words, the lengthening of the conveyor chain 10 due to the wear places the second photoelectric sensor 42 in a position depicted by 42(b) in FIG. 2, and thus, the photoelectric sensors 40, 42 do not actuate simultaneously. The time interval between the non-simultaneous actuation of the photoelectric sensors 40, 42 can be directly related to the chain stretch as described in detail below.

Figure 6:
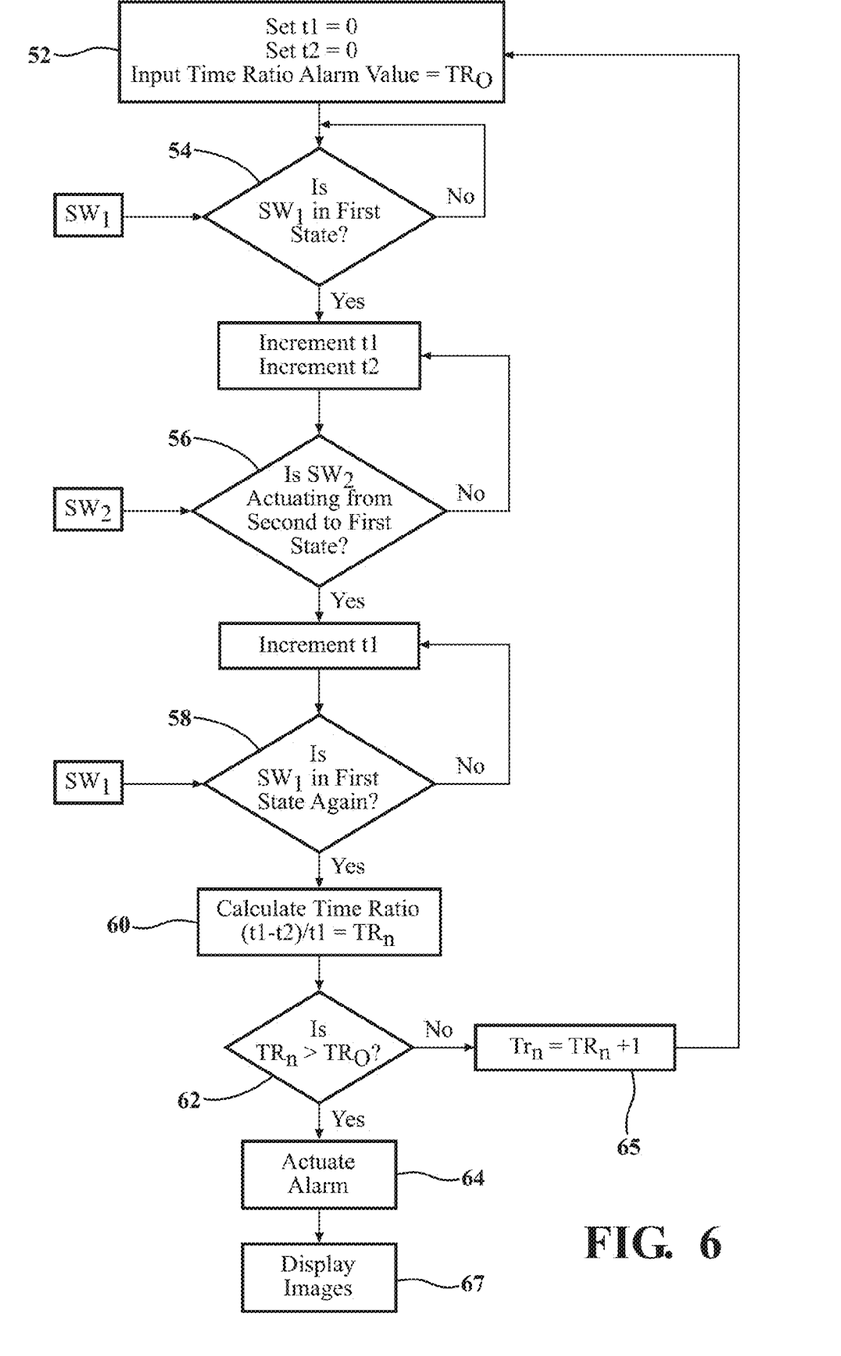
FIG. 6 is a flow chart illustrating the signal processing logic for determining the time intervals and the time ratio.

The method for automatically and visually monitoring the wear of the conveyor chain 10, using only the time intervals between the actuation of the photoelectric sensors 40, 42 may be understood with reference to the flow chart shown in FIG. 6. As noted in data entry block 52, timing interval $t_1$ and $t_2$ are reset to zero, and a time ratio alarm value $TR_o$ may be entered by the input 51 and stored in memory. The processor receives the signals sent by the photoelectric sensors 40, 42, and the signal from the first photoelectric sensor 40 is processed by query block 54. If the first photoelectric sensor 40 is in the first state 48, a clock pulse counter for each of the sensors 40, 42 and provided by the controller 46 begins to increment or count pulses. If the first photoelectric sensor 40 is not in the first state 48 (i.e. in the second state 50), then the processor updates the signal from the first photoelectric sensor 40 until the signal from the first photoelectric sensor 40 is in the first state 48.

If the conveyor chain 10 has stretched or lengthened, the second photoelectric sensor 42 will already be in the first state 48 when the first photoelectric sensor 40 is actuated in to the first state 48, as best shown in FIGS. 2 and 5. Thus, both counters continue to count until the second photoelectric sensor 42 is actuated into the second state 50 and back into the first state 48 as depicted by query block 56 in FIG. 6. If the second photoelectric sensor 42 is actuated back into the first state 48, the counter associated with the second photoelectric sensor 42 stops counting, and the controller 46 records the value as the second time interval $t_2$. If the second photoelectric sensor 42 has not actuated back into the first state 48, then the counters continue to count and update the signal from the second photoelectric sensor 42.

The counter associated with the first photoelectric sensor 40 continues to increment until the first photoelectric sensor 40 actuates into the second state 50 and returns back to the first state 48 for the second time, as depicted by query block 58. Once the first photoelectric sensor 40 returns to the first state 48 for the second time, the counter stops incrementing, and the value is stored in memory as first time interval $t_1$.

As shown in calculation block 60, a time ratio $TR_n$ is calculated by taking the difference between the first time interval $t_1$ and the second time interval $t_2$ and dividing by the count of the first time interval $t_1$. The time ratio $TR_n$ is compared to the predetermined time ratio alarm value $TR_o$ that was previously input and stored in memory in the controller 46. As shown in query block 62, if the time ratio $TR_n$ is greater than the preprogrammed time ratio alarm value $TR_o$, an indicator or alarm is actuated, as shown in data block 64, to warn the operator that the conveyor chain 10 has exceeded its allowable wear and that the conveyor chain 10 should be serviced. The indicator or alarm may comprise a warning light, message display, or audible alarm provided by the display 53 of the controller 46. The display 53 of the controller 46 may display the visual images captured by the first and second visualization devices 41 to identify wear or potential obstruction of each link 29 of the conveyor chain 10, as shown in data block 67. However, the visual images and videos from the visualization devices 41 may be displayed on a remote monitor or computer (not shown). The operator can selectively display any link 29 of the conveyor chain 10, as the processor correlates each frame visually captured by the first and second visualization devices 41 to a specific link 29 of the conveyor chain 10 through the signals generated and sent from the photoelectric sensors 40, 42 to the controller 46. This allows the operator to view images of the stretched or worn link 29 on the display 53 without having to stop the conveyor chain 10. Should the operator identify the stretched link 29 or obstruction in the conveyor chain 10, the operator can easily and specifically identify the chain link 29 that is affected by reviewing the images from the visualization devices 41, thereby reducing the time required to identify and maintain the affected chain link 29 of the conveyor chain 10. If the calculated time ratio $TR_n$ is less than the time ratio alarm value $TR_o$, then the wear has not reached an unacceptable value, and the process starts over by monitoring the next section of conveyor chain 10 as depicted by data block 65.

Figure 7:
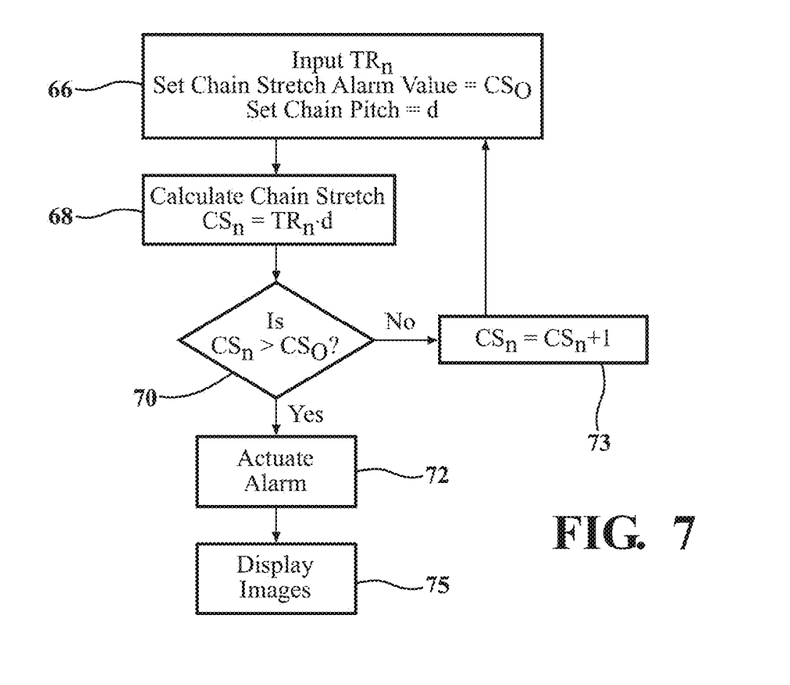
FIG. 7 is a flow chart illustrating the signal processing logic for determining chain stretch.

The method for calculating a linear distance for the chain stretch that corresponds to the linear distance in which the conveyor chain 10 has lengthened over the distance between the photoelectric sensors 40, 42 due to the conveyor chain 10 wearing may be understood with reference to the flow chart in FIG. 7. As seen in data entry block 66, the time ratio $TR_n$ has previously been determined, and the chain pitch d and chain stretch alarm value $CS_o$ are entered by the input 51 and stored in memory within the controller 46. Calculation block 68 calculates chain stretch $CS_n$ by multiplying the time ratio $TR_n$ by the chain pitch d, wherein the chain pitch d is the linear distance between common locations on successive chain links 29 when the chain stretch is zero. Since the chain pitch d is defined as a constant value, only the time ratio $TR_n$ is needed to identify the amount of wear in the conveyor chain 10, as the chain stretch $CS_n$ simply becomes a multiple of the time ratio $TR_n$. As provided in query block 70, if the calculated chain stretch $CS_n$ extends beyond the predetermined value $CS_o$, an indicator or alarm will actuate, as shown in data block 72, and will notify an operator that the chain stretch $CS_n$ has exceeded an allowable amount and that the conveyor chain 10 should be serviced. Again, the indicator or alarm may comprise a message display, warning lights, or audible arm provided by the display 53. Again, the operator will be able to selectively display visual images of any link 29 of the conveyor chain 10, as shown in data block 75, either on the display 53 or a remote monitor. If the calculated chain stretch $CS_n$ does not exceed the predetermined value $CS_o$, then the chain stretch $CS_n$ is acceptable, and the method starts again with the monitoring of the next segment of conveyor chain 10, as depicted by data block 73.

Figure 8:
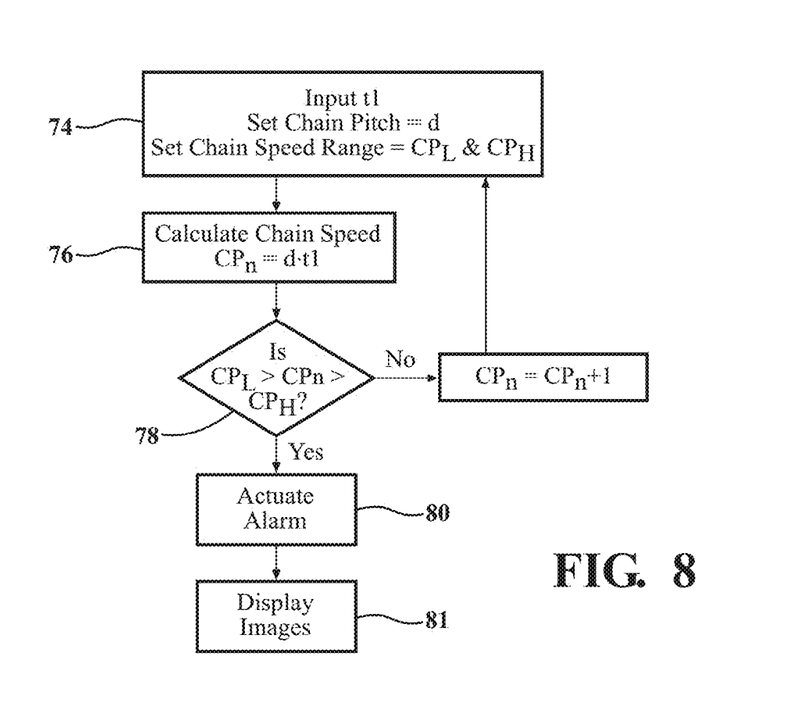
FIG. 8 is a flow chart illustrating the signal processing logic for determining instantaneous chain speed.

The controller 46 may also calculate the instantaneous chain speed as shown by the flow chart in FIG. 8. A predetermined allowable range for the instantaneous chain speed CPL, CPH is input by the input 51 and stored in memory in the controller 46, as shown in data entry block 74. As shown in calculation block 76, instantaneous chain speed $CP_n$ may be determined by multiplying the chain pitch d by the first time interval $t_1$ wherein the chain pitch d has already been input and stored in the controller 46, and the first time interval $t_1$ has been previously calculated. As seen in query block 78, if the instantaneous chain speed $CP_n$ extends outside the range of allowable instantaneous chain speed values CPL, CPH, an alarm or indicator is actuated, as shown in data block 80, and alerts an operator that the instantaneous chain speed $CP_n$ is outside of the allowable range, and thus, the conveyor chain 10 should be serviced. Once again, the alarm or indicator 80 may be a message display, warning lights, or an audible alarm provided by the display 53. The operator will also be able to selectively display visual images of any link 29 of the conveyor chain 10, as shown in data block 81, on the display 53 or on a remote monitor.

In order to prevent the alarms or indicators from actuating prematurely, an alarm debounce time may be utilized to prevent the alarms or indicators from occurring until the condition has existed for a predetermined amount of time. This is especially useful to prevent alarms from actuating prematurely when the conveyor 12 is first starting up. Chain speed $CP_n$, as well as the first and second time intervals $t_1$ and $t_2$, respectively, may temporarily extend beyond their range or limits during this period.

Because the photoelectric sensors 40, 42 are actuated by each chain link 29 of the conveyor chain 10, the above-noted calculations are essentially made after each indexing of the chain link 29 in the conveyor chain 10. Within the industry, it is common to measure ten foot sections of the conveyor chain 10 wherein the chain pitch d is twelve inches or one-foot long. Another common chain pitch d in the industry is eight inches. Such conveyor chains 10 may extend for several thousands of feet. The controller 46 stores and identifies each link 29 of the conveyor chain 10 so that a history of wear may be kept and recorded for each particular link 29 of the conveyor chain 10. The stored values may then be downloaded on a daily, weekly, or monthly basis, and a graph may be plotted to determine the performance characteristics, i.e. chain wear and chain speed, of the conveyor chain 10.

A magnetic origin point 82, as seen in FIG. 1, may be utilized to establish the origin of the conveyor chain 10 in order that the controller can reset a registry within the controller 46 for the first chain link 29 upon a separate sensor 84 sensing the origin of the conveyor chain 10. By determining the origin of the conveyor chain 10, each link 29 of the conveyor chain 10 can be identified, and thus, repetitive wear data can be accumulated and maintained for each section of conveyor chain 10. The identification of the chain links 29 by the controller 46 is used in association with the visualization devices 41 to correlate the chain links 29 with the images from the visualization devices 41.

As noted above, the signals from the photoelectric sensors 40, 42 are generated and processed for every chain link 29, although not every set of values is stored in memory. Therefore, it may be desirable to take an average of several time interval values, such as the previous three values, in order to avoid any type of unusual or inaccurate reading that may lead to a faulty alarm or indicator.

In an alternative embodiment, the photoelectric sensors 40, 42 may be mounted at different locations with respect to the primary links 30 when initially setting up the photoelectric sensors 40, 42 to monitor wear of the conveyor chain 10. When the photoelectric sensors 40, 42 are mounted at different locations with respect to the primary links 30, the photoelectric sensors 40, 42 do not actuate simultaneously even though chain stretch may be non-existent, and thus, the initial time interval to between the actuation of the photoelectric sensors 40, 42 into the first state 48 may be programmed into the controller 46. The initial time interval to may then be subtracted from the first time interval $t_1$ between the actuation of the photoelectric sensors 40, 42, and therefore, the first time interval $t_1$ is compensated so that it is equivalent to the same first time interval $t_1$ as the first embodiment.

It should also be noted that the counters increment in pulses or segments that are sixteen milliseconds long. Thus, the control means 46 first multiplies the number of counts by sixteen milliseconds in order to convert the count or pulses into seconds. The present disclosure is not limited to a count or pulse of sixteen milliseconds, but rather, the pulses may be equivalent to any desired length of time depending on the application. The sixteen millisecond count has been utilized in the first embodiment as a sufficient length of time for the accuracy desired for the present application.

Figure 9:
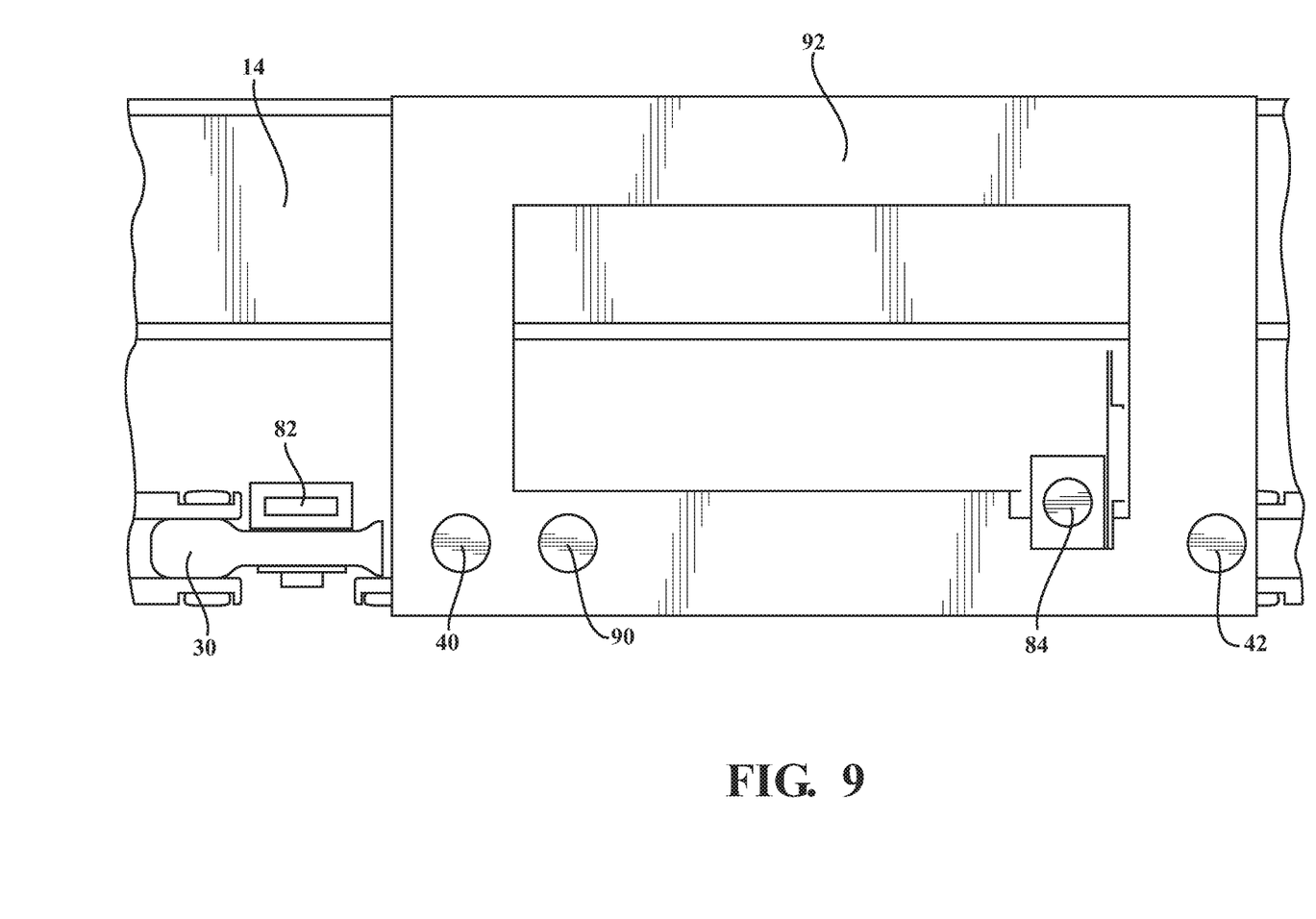
FIG. 9 is a schematic drawing showing a third sensor and the first sensor mounted to a monitor frame for providing signals to the controller for determining the direction of travel of the conveyor chain.

In yet another alternative embodiment, the direction in which the conveyor chain 10 is traveling may be determined by utilizing a third sensor 90 in conjunction with either the first sensor 40 or the second sensor 42. As a non-limiting example, FIG. 9 shows the third sensor 90 being used in conjunction with the first sensor 40 to determine the direction of travel of the conveyor chain 10. A monitor frame 92 is mounted in a stationary position along the guideway 14 and the conveyor chain 10. The monitor frame 92 may be utilized for mounting the first sensor 40, the second sensor 42, and the third sensor 90 in stationary positions on the monitor frame. The sensor 84 for determining the origin of the conveyor chain 10 as well as the controller 46 may also be mounted on the monitor frame 92. The third sensor 90 is similar to the first sensor 40 and the second sensor 42 in that the third sensor 90 may comprise of a photoelectric sensor, proximity switch, photodiode, laser, limit switch, or any other compatible sensing device. The third sensor 90 is mounted adjacent to the first sensor 40 at a distance that is less than the length of the primary link 30, such that both the first sensor 40 and the third sensor 90 sense the presence of the primary link 30 of the conveyor chain 10, as previously described. The first sensor 40 and the third sensor 90 each send a signal to the controller 46 indicating the presence of the primary link 30, and the controller 46 interprets the signals to determine the direction of travel of the conveyor chain 10. For instance, when both the first sensor 40 and the third sensor 90 detect the presence of the primary link 30 of the conveyor chain 10, the first sensor 40 and the third sensor 90 are in a first state. When either the first sensor 40 or the third sensor 90 change to a second state, the signal from the first sensor 40 or the third sensor 90 indicate the lack of the primary link 30 of the conveyor chain 10 therefore indicating the direction of travel of the conveyor chain 10. Thus, if the first sensor 40 indicates a lack of presence of the primary link 30 of the conveyor chain 10 first, then the conveyor chain 10 is moving left to right as shown in FIG. 9. If the third sensor 90 indicates a lack of presence of the primary link 30 of the conveyor chain 10 first, then the conveyor chain 10 is moving right to left as shown in FIG. 9. Once the controller 46 determines the direction of the conveyor chain 10, the controller 46 can make the appropriate calculations for determining the stretch of the conveyor chain 10. This allows the method and apparatus of the subject application to be utilized regardless of the travel direction of the conveyor chain 10.

It should be noted that this disclosure is not limited to a conveyor chain 10 or a continuous chain 10, but rather, the concepts disclosed may be utilized for any type of moving chain 10 where the chain 10 stretches due to wear, and where it is desirable to monitor chain wear without having to stop the chain 10.

While the invention has been shown and described with reference to a certain specific preferred embodiment, modification may now suggest itself to those skilled in the art. Such modifications and various changes in form and detail may be made herein without departing from the spirit and scope of the invention. Accordingly, it is understood that the invention will be limited only by the appended claims.

The invention claimed is:

1. A method for automatically and visually monitoring wear of a continuous chain having a plurality of links successively connected comprising the steps of:
    spacedly positioning a pair of sensors along the continuous chain, wherein the pair of sensors generate signals by sensing the presence and absence of each of the plurality of links;
    positioning a pair of opposing visualization devices at a point along and on opposite sides of the continuous chain, wherein the visualization devices capture images of each of the plurality of links;
    processing the signals generated by the pair of sensors to calculate the necessary time intervals for providing an output indicative of chain wear, wherein the signals are continually generated and processed for each of the plurality of links throughout the entire continuous chain to provide an output indicative of chain wear of any portion of the continuous chain;
    providing an indicator when the output exceeds a predetermined value; and
    selectively displaying the image of each of the plurality of links throughout the entire continuous chain wherein the displayed images correspond to the plurality of links identified by the pair of sensors for visually identifying and inspecting wear in the continuous chain.

2. The method as stated in claim 1, further comprising:
    positioning lubrication applicators adjacent the continuous chain for applying lubrication oil to the continuous chain; and
    displaying the image of the lubrication applicators to visually monitor the lubrication applicators.

3. The method as stated in claim 1, further comprising:
    providing electronic communication between the pair of sensors and the visualization devices to identify corresponding links between the images captured by the visualization devices and the pair of sensors.

4. The method as stated in claim 3, further comprising:
displaying still images from the captured images of the visualization devices.

5. The method as stated in claim 3, further comprising:
displaying video images from the captured images of the visualization devices.

6. The method as stated in claim 1, further comprising:
displaying images of the visualization devices from opposite sides of the continuous chain.

7. The method as stated in claim 1, further comprising:
positioning a third sensor adjacent to one of the pair of sensors along the continuous chain, wherein the third sensor generates a signal by sensing the presence and absence of each of the plurality of links; and
processing the signals of the third sensor and the one of the pair of sensors to determine the travel direction of the continuous chain.

8. The method as stated in claim 7, further comprising:
processing the signals of the third sensor and the one of the pair of sensors such that when both the third sensor and the one of the pair of sensors are simultaneously in a first state, the travel direction of the continuous chain can be determined by which of the third sensor or the one of the pair of sensors first changes to a second state.

9. An apparatus for automatically and visually monitoring the wear of a continuous chain having a plurality of links successively connected, comprising:
first and second sensors, spacedly positioned along the continuous chain, for sensing the presence of each of the plurality of links and generating signals therefrom;
first and second visualization devices, positioned at a point along and on opposite sides of the continuous chain for visually capturing images of each of the plurality of links;
a processor for processing the signals generated by the first and second sensors to calculate the necessary time intervals for providing an output indicative of the chain wear of the continuous chain, wherein the signals are continually generated and processed for each of the plurality of links throughout the entire continuous chain to provide an output indicative of chain wear of any portion of the continuous chain;
an indicator for indicating when the output exceeds a predetermined value; and
a display device for selectively displaying the images captured of each of the plurality of links of the continuous chain wherein the displayed images correspond to the plurality of links identified by the first and second opposing sensors for visually identifying wear in the continuous chain.

10. The apparatus as stated in claim 9, further comprising:
at least one lubrication applicator mounted adjacent the continuous chain; and
the display device displaying an image of the at least one lubrication applicator for visually monitoring the at least one lubrication applicator.

11. The apparatus as stated in claim 9, further comprising:
the processor providing electronic communication between the pair of sensors and the visualization devices to identify corresponding links between the images captured by the visualization devices and the pair of sensors.

12. The apparatus as stated in claim 11, further comprising:
the display device providing still captured images from the first and second visualization devices.

13. The apparatus as stated in claim 11, further comprising:
the display device providing video captured images from the first and second visualization devices.

14. The apparatus as stated in claim 9, further comprising:
the first and second visualization devices mounted on opposite sides of the continuous chain for viewing both sides of the continuous chain.

15. The apparatus as stated in claim 9, further comprising:
a third sensor adjacent to one of the first and second sensors along the continuous chain, wherein the third sensor generates a signal by sensing the presence and absence of each of the plurality of links; and
the processor processing the signals of the third sensor and the one of the first and second sensors to determine the travel direction of the continuous chain.

16. The apparatus as stated in claim 9, further comprising:
the processor processing the signals from the third sensor and the one of the first and second sensors such that when both the third sensor and the one of the first and second sensors are simultaneously in a first state, the travel direction of the continuous chain can be determined by indicating which of the third sensor or the one of the first or second sensors first changes to a second state.

* * * * *

UNITED STATES PATENT AND TRADEMARK OFFICE
CERTIFICATE OF CORRECTION

PATENT NO. : 9,896,276 B2
APPLICATION NO. : 15/416163
DATED : February 20, 2018
INVENTOR(S) : Patrick Brown et al.

Page 1 of 1

It is certified that error appears in the above-identified patent and that said Letters Patent is hereby corrected as shown below:

In Column 9, Line 19, please delete "to" and insert -- $t_0$ --; and

In Column 9, Line 21, please delete "to" and insert -- $t_0$ --.

Signed and Sealed this
Twenty-ninth Day of May, 2018

Andrei Iancu
*Director of the United States Patent and Trademark Office*